Figure 1:
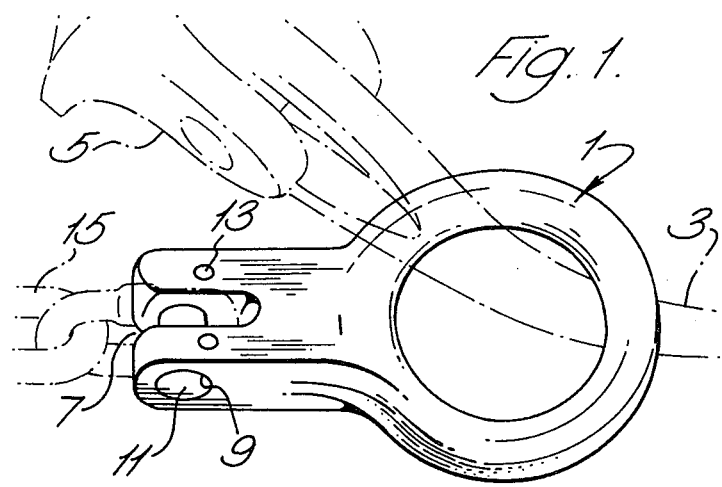

United States Patent [19]
Buschini et al.

[11] 3,959,909
[45] June 1, 1976

[54] KELLY'S EYE COMPONENT FOR A FISHING TRAWL

[75] Inventors: Anthony Alan Buschini, Fleetwood; Douglas Edward Swarsbrick, Stourport-on-Severn, both of England

[73] Assignee: Parsons Controls Limited, Stourport-on-Severn, England

[22] Filed: Aug. 19, 1974

[21] Appl. No.: 498,765

[30] Foreign Application Priority Data
Aug. 24, 1973  United Kingdom............... 40206/73

[52] U.S. Cl............................................ 43/8; 59/86
[51] Int. Cl.² ......................................... A01K 73/02
[58] Field of Search ............... 43/8, 9, 43.13; 59/86

[56] References Cited
UNITED STATES PATENTS

| | | |
|---|---|---|
| 1,582,641 | 4/1926 | Danielou et al. ........................ 43/9 |
| 2,363,668 | 11/1944 | Groen ............................... 43/43.13 |
| 2,369,344 | 2/1945 | Ehmann ................................ 59/86 |
| 2,869,255 | 1/1959 | Page ..................................... 59/86 |
| 3,319,990 | 5/1967 | Beal ...................................... 59/86 |
| 3,656,293 | 4/1972 | Lowery, Sr. ........................... 59/86 |

*Primary Examiner*—Warner H. Camp
*Attorney, Agent, or Firm*—Baldwin, Wight & Brown

[57] ABSTRACT

A Kelly's Eye component for a fishing trawl is disclosed, the component being formed of metal and having one end in the form of a ring defining an aperture which is sufficiently large to allow passage of a trawl rope, the other end of the component being in the form of a shackle, the two arms of which are apertured to receive a connecting pin and at least one of the arms having a further aperture therein extending at right angles to the first aperture and arranged tangential thereto to receive a locking pin so that an end link of a chain may be connected to the shackle.

2 Claims, 2 Drawing Figures

U.S. Patent June 1, 1976 3,959,909

KELLY'S EYE COMPONENT FOR A FISHING TRAWL

This invention relates to a Kelly's Eye, a component for use with chain used in a fishing trawl.

In the past, the deep sea trawling industry has had to rely upon mild steel fittings which are of uncertain strength, and wire rope for its trawls.

We have now found that by using heat treated alloy steel instead of mild steel, preferably nickel chromium molybdenum alloy steel, and fully heat treating the alloy, a much stronger and more reliable trawl results and the components can be made extremely wear resistant and have a Brinnell hardness in the range of 380–410. This wear resistance means that the life expectancy of our components and the chain itself should be of the order of 10:1 compared with components made of conventional mild steel. Furthermore, because of the quality of the steel alloy, it has been possible to design components and chain which, as well as having high strength, are of light weight and are easy to handle. This has the advantage of reducing crew fatigue and in certain instances of reducing manpower.

Traditional Kelly's Eyes have been of figure of eight construction, and a length of wire is spliced to the smaller of the two eyes of the figure of eight. It is now preferred in the trawling industry that chain be used instead of wire rope because chain has greater wearing characteristics. Furthermore, traditional Kelly's Eyes have had the two loops of the figure of eight lying in planes slightly inclined to each other. We have now developed a Kelly's Eye to supersede traditional Kelly's Eyes and which is adapted for connection to a length of chain.

According to the present invention we provide a Kelly's Eye component for use with trawling gear, said component comprising a metallic member, one end of which is in the form of a ring, the aperture in which is sufficiently large to allow passage of a trawl rope and the other end of which is slotted to resemble a shackle, the two arms of the other end being apertured to receive a connecting pin and at least one of the arms having a further aperture therein extending at right angles to the first aperture and being arranged tangential thereto to receive a locking pin arranged to engage in a tangential slot in the connecting pin in the main aperture, to enable an end link of a chain to be connected to said other end of the member.

Preferably, the two arms of the other end of the member are provided with oval apertures to receive an oval connecting pin.

Preferably, the component is formed of nickel chromium molybdenum alloy steel with a Brinell hardness in the region of 380 to 410.

Preferably, the component is substantially flat with its two ends being located in the same plane.

Also according to the present invention, we provide trawling gear which incorporates at least one Kelly's Eye trawl component as hereinbefore described.

Figure 2:
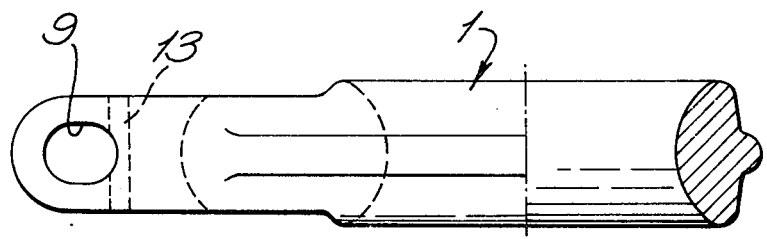

A preferred embodiment of Kelly's Eye according to the present invention is now described with reference to the accompanying drawings, in which:

FIG. 1 is a perspective view, and
FIG. 2 is a sectional elevation.

Referring to FIG. 1, the Kelly's Eye component is a metallic member having one end in the form of an annulus or ring 1 having a curved periphery shown in greater detail in FIG. 2. The internal diameter of the ring 1 is sufficiently great to allow easy sliding passage of a wire rope 3 but is sufficiently small to prevent passage of a stopper component 5 connected to the wire rope and which is the subject of our co-pending U.S. patent application Ser. No. 498,766, filed Aug. 19, 1974. The other end of the Kelly's Eye component is slotted at 7 and its two arms are provided with oval aperture means 9 to receive an oval connecting pin 11, thereby resembling a clevis or shackle. Further apertures 13 are provided in each of the arms of the other end of the component, extending at right angles to the oval aperture 9 and arranged tangential to said aperture to receive locking pins which engage in tangential grooves or slots in the connecting pin 11. It will thus be appreciated that the end link of a chain 15 can be connected to the other end of the component and for this purpose, the inner peripheral surfaces of the ends of the arms of the other end of the component may be dished to receive the end of the next link of the chain 15.

As can be seen from FIG. 2, the internal periphery of the ring 1 is flattened somewhat to allow chain to ride over it and co-operate with the shoulders of a stopper component fixed to the chain and the subject of our said co-pending application Ser. No. 498,766, to prevent jamming. By "flattened somewhat" it is meant that the inside surface of the ring is arcuate on a radius greater than one-half the thickness of the ring transversely to the general plane of the ring.

What is claimed is:

1. A Kelly's Eye component for use with trawling gear, the said component comprising a unitary metallic member, one end of which is in the form of a ring, the ring defining an aperture which is sufficiently large to allow passage of a trawl rope, the cross-section of the ring, within the ring, being arcuate on a radius greater than one-half the ring thickness transversely to the general plane of the ring, the other end of said metallic member being slotted to provide two arms and to resemble a clevis, said metallic member being substantially flat with its two said ends being in the same plane, said two arms being closer together than the inside diameter of said ring and having a first aperture means normal to the slot between said arms, at least one of said arms having a further aperture extending at right angles to the said first aperture means and being arranged tangential thereto, a connecting pin in said first aperture means spanning said slot and having a tangential slot in its outer surface, and a locking pin engaged in said further aperture and in said tangential slot in the connecting pin, said connecting pin being adapted to receive a link of a chain to thereby connect said chain to said other end of the member.

2. Trawling gear incorporating at least one Kelly's Eye trawl component as claimed in claim 1, a chain having a link disposed in the slot between said two arms and through which link said connecting pin extends, a trawl rope extending through said aperture in said ring form, and a stopper component connected to said trawl rope and being of a size to prevent being passed through said last named aperture.

* * * * *